US011608432B2

(12) United States Patent
Lecouvet et al.

(10) Patent No.: US 11,608,432 B2
(45) Date of Patent: Mar. 21, 2023

(54) PELLET COMPRISING THERMOPLASTIC POLYMER SHEATH SURROUNDING GLASS FILAMENTS HAVING REDUCED EMISSIONS

(71) Applicant: SABIC GLOBAL TECHNOLOGIES B.V., Bergen op Zoom (NL)

(72) Inventors: Benoit Therese Philippe Lecouvet, Geleen (NL); Christelle Marie Helene Grein, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 952 days.

(21) Appl. No.: 16/468,626

(22) PCT Filed: Dec. 12, 2017

(86) PCT No.: PCT/EP2017/082456
§ 371 (c)(1),
(2) Date: Jun. 11, 2019

(87) PCT Pub. No.: WO2018/108929
PCT Pub. Date: Jun. 21, 2018

(65) Prior Publication Data
US 2020/0087498 A1 Mar. 19, 2020

(30) Foreign Application Priority Data
Dec. 12, 2016 (EP) ..................... 16203458

(51) Int. Cl.
| | | |
|---|---|---|
| C08L 23/12 | (2006.01) | |
| B29B 9/14 | (2006.01) | |
| B29B 15/12 | (2006.01) | |
| B29B 9/06 | (2006.01) | |
| B29C 45/00 | (2006.01) | |
| C03C 25/30 | (2018.01) | |
| C08J 5/08 | (2006.01) | |
| B29K 23/00 | (2006.01) | |
| B29K 309/08 | (2006.01) | |
| C08F 210/16 | (2006.01) | |

(52) U.S. Cl.
CPC .............. C08L 23/12 (2013.01); B29B 9/06 (2013.01); B29B 15/12 (2013.01); B29C 45/0001 (2013.01); C03C 25/30 (2013.01); C08J 5/08 (2013.01); B29B 9/14 (2013.01); B29K 2023/12 (2013.01); B29K 2309/08 (2013.01); C08F 210/16 (2013.01); C08F 2810/10 (2013.01); C08L 2205/025 (2013.01); C08L 2207/02 (2013.01)

(58) Field of Classification Search
CPC .............. C08F 210/16; C08F 210/06; C08F 2810/10; C08L 23/12; C08L 2207/02; B29B 15/14; B29B 15/12; B29B 9/06; B29B 9/14
See application file for complete search history.

(56) References Cited

U.S. PATENT DOCUMENTS

| | | |
|---|---|---|
| 4,282,076 A | 8/1981 | Boynton |
| 4,338,233 A | 7/1982 | Das et al. |
| 4,771,024 A | 9/1988 | Nestlerode et al. |
| 4,866,022 A | 9/1989 | Arzoumanidis et al. |
| 5,017,714 A | 5/1991 | Welborn, Jr. |
| 5,093,415 A | 3/1992 | Brady, III et al. |
| 6,218,504 B1 | 4/2001 | Dolle et al. |
| 6,395,670 B1 | 5/2002 | Morini et al. |
| 6,825,146 B2 | 11/2004 | Kilty et al. |
| 9,527,989 B2 * | 12/2016 | Herklots ................ B29C 45/00 |
| 10,072,105 B2 * | 9/2018 | Bercx ...................... C08F 8/50 |
| 10,087,319 B2 * | 10/2018 | Grein ...................... C08L 23/16 |
| 10,435,552 B2 * | 10/2019 | Lecouvet ................ C08L 23/12 |
| 10,486,335 B2 * | 11/2019 | Tufano .................... B29B 9/06 |
| 10,486,337 B2 * | 11/2019 | Tufano .................. B29B 15/122 |
| 10,828,802 B2 * | 11/2020 | Biemond ................ B29B 9/14 |
| 10,995,158 B2 * | 5/2021 | Lecouvet .............. C08F 210/06 |
| 11,292,898 B2 * | 4/2022 | Herklots .............. C08F 110/06 |
| 2010/0313605 A1 * | 12/2010 | Soliman .................... B29B 9/16 65/442 |
| 2016/0272770 A1 * | 9/2016 | Tufano .................... B29B 9/16 |
| 2018/0200921 A1 * | 7/2018 | Grein ...................... B29B 9/12 |
| EP 127A195 | | 1/2003 |

FOREIGN PATENT DOCUMENTS

| | | |
|---|---|---|
| EP | 0019330 A1 | 11/1980 |
| EP | 0063654 A1 | 11/1982 |
| EP | 0206189 A1 | 12/1986 |
| EP | 398698 A2 | 11/1990 |
| EP | 0397505 B1 | 12/1994 |

(Continued)

OTHER PUBLICATIONS

European Search Report; European Application No. 16203458.1; International Filing Date: Dec. 12, 2016; 2 pages.
International Search Report; International Application No. PCT/EP2017/082456; International Filing Date: Dec. 12, 2017; dated Feb. 14, 2018; 3 pages.
Periodic System of the Elements (Handbook of Chemistry and Physics, 70th Edition, CRC Press, 1989-1990 (1 page).
Written Opinion; International Application No. PCT/EP2017/082456; International Filing Date: Dec. 12, 2017 dated Feb. 14, 2018; 5 pages.

Primary Examiner — Rip A Lee
(74) Attorney, Agent, or Firm — Cantor Colburn LLP

(57) ABSTRACT

The invention relates to a pellet comprising a thermoplastic polymer sheath intimately surrounding glass filaments, which glass filaments are covered at least in part with an impregnating agent and extend in a longitudinal direction of said pellets, wherein the thermoplastic polymer sheath is prepared from a thermoplastic polymer composition comprising A) a heterophasic propylene copolymer consisting of a propylene-based matrix and a dispersed ethylene-α-olefin copolymer, wherein the heterophasic propylene copolymer has a melt flow rate of at least 40 g/10 min as determined in accordance with ISO 1133 (230° C., 2.16 kg) and a FOG value of at most 350 μg/g as determined by VDA 278, wherein the glass filaments are present in an amount of 10-70 wt % based on the pellet.

16 Claims, No Drawings

(56) References Cited

FOREIGN PATENT DOCUMENTS

| | | | |
|---|---|---|---|
| EP | 1460166 A1 | 9/2004 | |
| EP | 0994978 B1 | 10/2004 | |
| EP | 1838741 B1 | 4/2011 | |
| GB | 1272778 A | 5/1972 | |
| WO | 9632426 A1 | 10/1996 | |
| WO | 9806551 A2 | 2/1998 | |
| WO | WO 98/16359 A1 * | 4/1998 | ............ B29B 9/14 |
| WO | 02088194 A1 | 11/2002 | |
| WO | 03068828 A1 | 8/2003 | |
| WO | 2004039848 A1 | 5/2004 | |
| WO | 2006056338 A1 | 6/2006 | |
| WO | 2007134851 A1 | 11/2007 | |
| WO | 2009080281 A1 | 7/2009 | |
| WO | WO 2009/080281 A1 * | 7/2009 | ............ B29B 9/14 |
| WO | 2014044680 A1 | 3/2014 | |
| WO | 2014053590 A1 | 4/2014 | |
| WO | 2015062825 A1 | 5/2015 | |
| WO | 2015150042 A1 | 10/2015 | |
| WO | 2018108927 A1 | 6/2018 | |
| WO | 2018108935 A1 | 6/2018 | |
| WO | 2018108936 A1 | 6/2018 | |

* cited by examiner

PELLET COMPRISING THERMOPLASTIC POLYMER SHEATH SURROUNDING GLASS FILAMENTS HAVING REDUCED EMISSIONS

CROSS REFERENCE TO RELATED APPLICATIONS

This application is a 371 of International Application No. PCT/EP2017/082456, filed Dec. 12, 2017, which is incorporated by reference in its entirety, and which claims priority to European Application Serial No. 16203458.1, filed Dec. 12, 2016.

The invention relates to a pellet comprising a thermoplastic polymer sheath intimately surrounding glass filaments, to a process for the preparation of said pellet, to an article prepared from said pellet and to the use of said pellet in automotive (interior) applications.

Pellets comprising a thermoplastic polymer sheath intimately surrounding glass filaments, which glass filaments are covered at least in part with an impregnating agent and extend in a longitudinal direction of said pellets, are for example commercially available under the brand name STAMAX.

Typically, such pellets are used for the preparation of injection molded articles requiring a high stiffness (flexural modulus). Mechanical properties such as a high stiffness are especially important in automotive applications.

The thermoplastic polymer sheath of such pellets can be prepared from different thermoplastic polymer compositions, but is preferably prepared from a polypropylene composition, more preferably from a composition comprising a heterophasic propylene copolymer.

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications. One of the requirements for propylene polymers such as heterophasic propylene copolymers in automotive interior applications is that it has a relatively low emission of low molecular weight materials. In other words, such propylene polymers may contain only a very low amount of low molecular weight oligomers, because such low molecular weight materials can cause an unpleasant odor, a sticky feeling of the surface or may condense against windscreens thereby causing a reduced visibility.

One of the requirements related to such emission is laid down in the VDA 278 standard. The emission as determined in that standard is referred to as the FOG value. For example car manufacturers may require that the FOG value is typically at most 500 μg/g, more in particular at most 400 μg/g. With requirements becoming more strict in future, FOG values of at most 350 μg/g or even at most 250 μg/g are desirable.

Currently a method for reducing FOG emission involves maintaining polypropylene pellets or powders at a certain elevated temperature for a certain amount of time. For example polypropylene pellets or powders may be continuously fed to the top of a silo where the polypropylene is preferably contacted in counter-flow with a stream of hot gas, which may be for example nitrogen or dried air. At the bottom of the silo polypropylene having a reduced FOG value is then continuously withdrawn. This process is often referred to as venting, degassing or purging. It is noted that this venting, degassing or purging should not be confused with the removal of unreacted monomer as is usually carried out directly after polymerisation.

Venting, degassing or purging processes are disclosed for example in GB 1272778, WO 02/088194, WO2004/039848 and U.S. Pat. No. 6,218,504. Other methods to remove low molecular weight materials also exist, among which are steam stripping or chemical treatment.

A disadvantage of a venting step is that such an extra step adds cost to the final heterophasic propylene copolymer product. In particular it is noted that heterophasic propylene copolymers having a relatively high initial FOG value generally need to be maintained for a longer period of time in the venting equipment. Such a longer residence time not only increases the overall cost, but may also have a negative effect on the optical properties of the material in that the heterophasic propylene copolymer suffers from more yellowing due to partial thermal degradation.

Another trend in industry is down-gauging: the desire to more efficienty produce materials with at least a similar property profile, e.g. by producing with less material and/or by using less energy. In order to use less energy for injection molding, a higher melt flow rate of the polymer, in this case heterophasic propylene copolymer is desired. A higher melt flow rate will enable faster injection molding and hence will reduce the energy needed per produced article. Also, it is a cost-effective solution as this allows for a shorter cycle time and therefore increases productivity.

However, typically a higher melt flow rate also increases the FOG due to the presence of a larger low molecular weight fraction, which fraction can be more easily emitted from a composition/article prepared therefrom.

Therefore, it is the object of the invention to provide pellets comprising a thermoplastic polymer sheath intimately surrounding glass filaments combining low FOG values with a high melt flow rate, while maintaining desirable mechanical and rheological properties.

This object is achieved by a pellet comprising a thermoplastic polymer sheath intimately surrounding glass filaments, which glass filaments are covered at least in part with an impregnating agent and extend in a longitudinal direction of said pellets, wherein the thermoplastic polymer sheath is prepared from a thermoplastic polymer composition comprising A) a heterophasic propylene copolymer consisting of a propylene-based matrix and a dispersed ethylene-α-olefin copolymer, wherein the heterophasic propylene copolymer has a melt flow rate of at least 40 g/10 min as determined in accordance with ISO 1133 (230° C., 2.16 kg) and a FOG value of at most 350 μg/g as determined by VDA 278, wherein the glass filaments are present in an amount of 10-70 wt % based on the pellet.

The pellets of the invention have a high melt flow rate and therefore allow for easy and fast processing, such as injection molding. In addition, the articles prepared from such pellets combine high stiffness with a low emission, making these pellets very suitable for the production of automotive parts, in particular automotive interior parts.

A process for manufacturing such pellets is known from WO 2009/080281, which process comprises the subsequent steps of:

a) unwinding from a package of at least one continuous glass multifilament strand containing at most 2% by mass of a sizing composition;

b) applying from 0.5 to 20% by mass of an impregnating agent to said at least one continuous glass multifilament strand to form an impregnated continuous multifilament strand;

c) applying a sheath of thermoplastic polymer around the impregnated continuous multifilament strand to form a sheathed continuous multifilament strand;

characterised in that the impregnating agent is non-volatile, has a melting point of at least 20° C. below the melting point of the thermoplastic matrix, has a viscosity of from 2.5 to 100 cS at application temperature, and is compatible with the thermoplastic polymer to be reinforced.

According to WO 2009/080281 the sheathed continuous glass multifilament strand may be cut into pellets having a length of from 2 to 50 mm, preferably from 5 to 30 mm, more preferably from 6 to 20 mm and most preferably from 10 to 15 mm.

Preferably, the pellets of the invention have a length in the range from 2 to 50 mm, for example from 5 to 20, for example from 10 to 15 mm.

The process as described in WO2009/080281 is hereby incorporated by reference.

The pellets of the present invention contain from 10 to 70 wt % glass filaments based on the weight of the pellets, for example from 10 to 50 wt %, for example from 10 to 40 wt % or for example from 20 to 60 wt % of glass filaments based on the weight of the pellets.

The glass filaments in the pellets used in the present invention preferably have a thickness of from 5-50 μm preferably from 10-30 μm, more preferably from 15-25 μm. The glass filaments are generally circular in cross section.

The term intimately surrounding as used herein is to be understood as meaning that the thermoplastic polymer sheath substantially entirely contacts the core containing the at least partially covered glass filaments. Said in another way the sheath is applied in such a manner that there is no deliberate gap between an inner surface of the sheath and the core containing the fibre filaments. A skilled person will nevertheless understand that a certain small gap between the thermoplastic polymer sheath and the glass filaments may be formed as a result of process variations. Preferably, therefore, the polymer sheath comprises less than 5 wt. % of said filament, preferably less than 2 wt. % of filament based on the total weight of the polymer sheath.

The length of the glass filaments typically corresponds to the length of the pellet. Small differences in length between the pellet and the glass filaments may arise due to post-extrusion shrinkage of the thermoplastic polymer sheath or due to the applied pellet cutting technology. The glass filaments generally lie in parallel to one another. For the avoidance of doubt, it should be understood that the glass filaments as used in the present invention are not embedded in the thermoplastic polymer sheath.

The glass filaments in the pellets subject to the use of the present invention preferably contain at most 2 wt % of a sizing composition based on the total weight of the glass filaments.

Examples of impregnating agents include but are not limited to those described below.

In one embodiment, preferably the thermoplastic polymer composition comprises at least 80 wt % of the heterophasic propylene copolymer, for example at least 90 wt % heterophasic propylene copolymer, at least 93 wt %, for example at least 95 wt %, for example at least 97 wt % of heterophasic propylene copolymer, for example at least 98 wt % or for example at least 99 wt % of heterophasic propylene copolymer. In a special embodiment, the thermoplastic polymer composition consists of the heterophasic propylene copolymer.

In another embodiment, the thermoplastic polymer composition comprises at least 60 wt %, for example at least 70 wt %, for example at least 75 wt % and/or at most 99 wt %, for example at most 95 wt %, for example at most 90 wt % heterophasic propylene copolymer.

Preferably, the heterophasic propylene copolymer is prepared according to the process for the manufacture of the heterophasic propylene copolymer as described herein.

Preferably, the melt flow rate of the heterophasic propylene copolymer is at least 40 dg/min, for example at least 50 dg/10 min or at least 60 dg/10 min, and/or at most 90 dg/min, for example at most 80 dg/min or at most 70 dg/min (ISO 1133, 230° C., 2.16 kg). Preferably, the melt flow rate of the heterophasic propylene copolymer is in the range from 50 to 80 dg/min (ISO 1133, 230° C., 2.16 kg). The lower melt flow rate of at most 80 dg/min or at most 70 dg/min is advantageous for lower FOG values.

The heterophasic propylene copolymer consisting of a propylene-based matrix and a dispersed ethylene-α-olefin copolymer, wherein the heterophasic propylene copolymer has a target melt flow rate of at least 40 g/10 min as determined in accordance with ISO 1133 (230° C., 2.16 kg) and a FOG value of at most 350 μg/g as determined by VDA 278, is preferably prepared by a process comprising the steps of:

I) polymerizing monomers to obtain an intermediate heterophasic propylene copolymer having an intermediate melt flow rate and II) visbreaking said intermediate heterophasic propylene copolymer, for example during extrusion directly after step I), to obtain the heterophasic propylene copolymer having said target melt flow rate and said FOG value and wherein the ratio of the target melt flow rate to the intermediate melt flow rate is more than 1, wherein step I) is performed in the presence of a catalyst system comprising a Ziegler-Natta catalyst and at least one external electron donor chosen from the group of a compound having a structure according to Formula III $(R^{90})_2$ N—Si$(OR^{91})_3$, a compound having a structure according to Formula IV: $(R^{92})$Si$(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, preferably ethyl, methyl or n-propyl, more preferably wherein the at least one external electron donor is chosen from the group of diethylaminotriethoxysilane (DEATES), n-propyl triethoxysilane, (nPTES), n-propyl trimethoxysilane (nPTMS) and mixtures thereof.

For example, the catalyst system may be obtained by a catalyst preparation process comprising the steps of:

providing a magnesium-based support;

optionally activating said magnesium-based support;

contacting said magnesium-based support with a Ziegler-Natta type catalytic species, and optionally one or more internal electron donors to yield a procatalyst, and contacting said procatalyst with a co-catalyst and the at least one external donor.

The steps I) and II) are carried out sequentially and preferably directly after one another. That is, step II) is preferably carried out on the intermediate heterophasic propylene copolymer obtained directly from step I). It is noted however that step I) may include after the polymerisation the addition of common stabilisers for preventing the intermediate heterophasic propylene copolymer of step I) from degradation, such being well known to the skilled person.

It will be understood that the description of the heterophasic propylene copolymer applies to both the intermediate heterophasic propylene copolymer obtained after step I) and the heterophasic propylene copolymer obtained after step II), unless otherwise stated.

Heterophasic propylene copolymers are generally prepared by polymerization of propylene (or propylene and α-olefin) by contacting propylene (or propylene and α-olefin) with a catalyst and subsequent preparation of an ethylene-α-olefin mixture by polymerization of ethylene and the α-olefin by contacting ethylene and α-olefin with a catalyst. The resulting polymeric materials are heterophasic, but the specific morphology usually depends on the preparation method and monomer ratios used.

The intermediate heterophasic propylene copolymer can be produced using any conventional technique known to the skilled person, for example gas phase polymerization.

The heterophasic propylene copolymer consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

Preferably, the heterophasic propylene copolymer consists of
(a) a propylene-based matrix,
  wherein the propylene-based matrix consists of a propylene homopolymer and/or a propylene-α-olefin copolymer prepared from at least 90 wt % of propylene and at most 10 wt % of α-olefin, based on the total weight of the propylene-based matrix and
  wherein the propylene-based matrix is present in an amount of 60 to 95 wt % based on the total heterophasic propylene copolymer and
(b) a dispersed ethylene-α-olefin copolymer,
  wherein the dispersed ethylene-α-olefin copolymer is present in an amount of 40 to 5 wt % based on the total heterophasic propylene copolymer and
  wherein the sum of the total amount of propylene-based matrix and total amount of the dispersed ethylene-α-olefin copolymer in the heterophasic propylene copolymer is 100 wt %.

The propylene-based matrix consists of a propylene homopolymer and/or a propylene-α-olefin copolymer prepared from at least 90 wt % of propylene and up to 10 wt % of α-olefin, for example ethylene, for example prepared from of at least 93 wt % of propylene and up to 7 wt % of α-olefin, for example prepared from of at least 97 wt % of propylene and up to 13 wt % of α-olefin, based on the total weight of the propylene-based matrix.

Preferably, the α-olefin used to prepare the propylene-α-olefin copolymer is selected from the group of α-olefins having 2 or 4-10 carbon atoms, for example ethylene, 1-butene, 1-pentene, 4-methyl-1-pentene, 1-hexene, 1-heptene or 1-octene, and is preferably ethylene.

Preferably, the propylene-based matrix consists of a propylene homopolymer. The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM).

The dispersed ethylene-α-olefin copolymer is present in an amount of 40 to 5 wt %, for example in an amount of 35 to 15 wt % based on the total heterophasic propylene copolymer, for example in an amount of at least 20 wt % and/or for example in an amount of at most 30 wt % based on the total heterophasic propylene copolymer.

In the heterophasic propylene copolymer in the thermoplastic polymer composition, the sum of the total weight of the propylene-based matrix and the total weight of the dispersed ethylene-α-olefin copolymer is 100 wt %.

Preferably, the amount of ethylene used to prepare the ethylene-α-olefin copolymer is in the range of 20 to 65 wt %, for example in the range of 40 to 60 wt % based on the ethylene-α-olefin copolymer, for example the amount of ethylene used to prepare the ethylene-α-olefin copolymer is at least 30 wt % and/or for example at most 55 wt % based on the ethylene-α-olefin copolymer.

The α-olefin used to prepare the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

Step I)

The intermediate heterophasic propylene copolymer may be prepared in step I). It is herein understood that the term 'intermediate heterophasic propylene copolymer' is a heterophasic propylene copolymer obtained directly after step I) before it is subjected to step II) visbreaking. By step II) visbreaking, the final heterophasic propylene copolymer is produced. It is herein understood that the term 'final heterophasic propylene copolymer' is a heterophasic copolymer obtained after visbreaking.

Preferably, step I) involves
  Ia) polymerizing propylene and optional α-olefin by contacting propylene and optional α-olefin with a presence of the catalyst system to obtain the propylene-based matrix and
  Ib) subsequently polymerizing ethylene and α-olefin in the propylene-based matrix by contacting ethylene and α-olefin with a catalyst system to obtain the dispersed ethylene-α olefin copolymer,
  for example in two or more reactors.

Preferably, steps Ia) and Ib) are performed in different reactors connected in series.

Preferably, the propylene-based matrix of the intermediate propylene copolymer has a melt flow rate of at most 70 dg/min, preferably at most 60 dg/min, preferably at most 50 dg/min, preferably at most 45 dg/min, preferably at most 40 dg/min, preferably at most 35 dg/min, preferably at most 30 dg/min, most preferably at most 25 dg/min, for example at most 20 dg/min (ISO 1133, 230° C., 2.16 kg) and for example at least 15 dg/min. This is advantageous for low emission of the final heterophasic propylene composition since the amount of low molecular weight oligomers increases with increasing the melt flow rate of the propylene-based matrix. Preferably, the propylene-based matrix of the intermediate propylene copolymer has a melt flow rate of at least 2 dg/min, at least 3 dg/min, at least 4 dg/min, at least 5 dg/min or for example at least 10 dg/min, for example at least 15 dg/min(ISO 1133, 230° C., 2.16 kg).

Preferably, the dispersed ethylene α-olefin copolymer of the intermediate propylene copolymer has a melt flow rate of at least 0.001 dg/min, at least 0.01 dg/min, at least 0.1 dg/min, at least 0.3 dg/min, at least 0.7 dg/min, at least 1 dg/min, and/or for example at most 10 dg/min, at most 5 dg/min or at most 3 dg/min, measured according to ISO1133 (2.16 kg/230° C.). Preferably, the intermediate heterophasic propylene copolymer has a melt flow rate (intermediate melt flow rate) of at most 30 dg/min, more preferably at most 20 dg/min, more preferably at most 15 dg/min (ISO 1133, 230° C., 2.16 kg). Preferably, the melt flow rate of the intermediate heterophasic propylene copolymer is at least 2 dg/min, preferably at least 3 dg/min, preferably at least 4 dg/min, preferably at least 5 dg/min, or preferably at least 7 dg/min, for example at least 9 dg/min or at least 10 dg/min (ISO 1133, 230° C., 2.16 kg).

In a preferred embodiment, the propylene-based matrix of the intermediate propylene copolymer has a melt flow rate in the range from 10 to 30 dg/min, and the intermediate heterophasic propylene copolymer has a melt flow rate in the range from 7 to 15 dg/min.

Preferably, the intermediate heterophasic propylene copolymer has a FOG value as measured in accordance with VDA 278 of at most 250 μg/g, preferably at most 200 μg/g and more preferably at most 150 μg/g. The skilled person will understand that the term μg/g means micrograms of low molecular weight components per gram of polypropylene.

Catalyst System

Step Ia) and/or step Ib) may be performed by contacting propylene and the optional α-olefin with a catalyst system, for example a catalyst system which comprises a Ziegler-Natta catalyst and at least one external electron donor, which external electron donor is preferably chosen from the group of a compound having a structure according to Formula III $(R^{90})_2N\text{—}Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(OR^a)_{4-n}R^b_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS), diethylaminotriethoxysilane (DEATES), n-propyl triethoxysilane, (nPTES), n-propyl trimethoxysilane (nPTMS) and mixtures thereof.

Preferably, step Ia) and Ib) are performed by contacting propylene and the optional α-olefin with the same catalyst system.

Such organosilicon compounds mentioned above are known in the art (for instance as disclosed in documents WO2006/056338A1, EP183874161, U.S. Pat. No. 6,395,670B1, EP398698A1, WO96/32426A).

Preferably, the catalyst system used in step I) is obtained by a catalyst preparation process comprising the steps of:
  providing a magnesium-based support;
  optionally activating said magnesium-based support using an activator;
  contacting said magnesium-based support with a Ziegler-Natta type catalytic species, and optionally one or more internal electron donors to yield a procatalyst, and
  contacting said procatalyst with a co-catalyst and at least one external electron donor;

More preferably, the catalyst system is obtained by
a catalyst preparation process comprising the steps of: A) providing a procatalyst obtainable via a process comprising the steps of:
  i) contacting a compound $R^4_zMgX^4_{2-z}$ with an alkoxy- or aryloxy-containing silane compound to give a first intermediate reaction product, being a solid $Mg(OR^1)_xX^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;
  ii) optionally contacting the solid $Mg(OR^1)_xX^1_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;
  iii) contacting the first or second intermediate reaction product, obtained respectively in step i) or ii), with a halogen-containing Ti-compound and optionally an internal electron donor to obtain said procatalyst;
B) contacting said procatalyst with a co-catalyst and the at least one external electron donor to form a catalyst.

Preferably in step i) of said process, the compound of formula $R^4_zMgX^4_{2-z}$ is a phenyl or butyl Grignard reagent (PhMgCl or BuMgCl), more preferably a BuMgCl.

The aluminum/external donor molar ratio in the catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

Some examples of Ziegler-Natta (pro)catalysts and their preparation method can be found in EP 1 273 595, EP 0 019 330, U.S. Pat. No. 5,093,415, Example 2 of U.S. Pat. No. 6,825,146, 4,771,024 column 10, line 61 to column 11, line 9, WO03/068828, U.S. Pat. No. 4,866,022, WO96/32426A, example I of WO 2007/134851 A1, all of which are hereby incorporated by reference.

The procatalyst thus prepared can be used in polymerization of olefins using an external donor, for example as exemplified above, and a co-catalyst.

The catalyst system includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, tri-isobutylaluminum, trihexylaluminum, di-isobutylaluminum hydride, trioctylaluminium, dihexylaluminum hydride and mixtures thereof, most preferably, the cocatalyst is triethyl-aluminium (abbreviated as TEAL).

The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters) or benzoic acid esters, for example ethyl benzoate; (N-alkyl)amidobenzoates, 1,3-diethers, 1,5-diethers, silyl esters, fluorenes, succinates and/or combinations thereof.

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst.

The molar ratio of the internal donor relative to the magnesium is for example from 0.02 to 0.5. Preferably, this molar ratio is preferably between 0.05 and 0.2.

Step II)

The term "visbreaking" is well known in the field of the invention. For example methods of visbreaking polypropylene have been disclosed in U.S. Pat. No. 4,282,076 and EP 0063654.

Several different types of chemical reactions which are well known can be employed for visbreaking propylene polymers. An example is thermal pyrolysis, which is accomplished by exposing a polymer to high temperatures, e.g., in an extruder at 350° C. or higher. Another approach is exposure to powerful oxidizing agents. A further approach is exposure to ionizing radiation. It is preferred however that visbreaking is carried out using a peroxide. Such materials, at elevated temperatures, initiate a free radical chain reaction resulting in beta-scission of the polypropylene molecules. The visbreaking may be carried out directly after polymerisation and removal of unreacted monomer and before pelletisation (during extrusion in an extruder wherein shifting of the intermediate heterophasic propylene copolymer occurs). However, the invention is not limited to such an embodiment and visbreaking may also be carried out on already pelletised polypropylene, which polypropylene generally contains stabilisers to prevent degradation.

Examples of suitable peroxides include organic peroxides having a decomposition half-life of less than 1 minute at the average process temperature during step II). Suitable organic peroxides include but are not limited to dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyi peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate, cumene hydroperoxide, diisopropyl benzene hydroperoxide, 1,3-bis(t-butylperoxy-isopropyl)benzene, dicumyl peroxide, tert-butylperoxy isopropyl carbonate and any combination thereof. Preferably, a dialkyl peroxide is employed in said process. More preferably, the peroxide is a,a'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane. Preferably, the peroxide is selected from the group of non-aromatic peroxides.

It can easily be determined by the person skilled in the art through routine experimentation how much peroxide should be used to obtain a composition having the desired melt flow rate. This also depends on the half-life of the peroxide and on the conditions used for the melt-mixing, which in turn depend on the exact composition.

Typically, the amount of peroxide used will lie in the range of 0.02 to 0.5 wt %, for example 0.08 to 0.2 wt %, for example 0.1 to 0.2 wt %, based on the intermediate heterophasic propylene copolymer produced in step I).

The heterophasic propylene copolymer obtained after step II) has a target melt flow rate. Preferably, the target melt flow rate of the heterophasic propylene copolymer is at least 40 dg/min, for example at least 50 dg/10 min or at least 60 dg/10 min, and/or at most 90 dg/min, for example at most 80 dg/min or at most 70 dg/min (ISO 1133, 230° C., 2.16 kg). Preferably, the target melt flow rate of the heterophasic propylene copolymer is 50-80 dg/min (ISO 1133, 230° C., 2.16 kg). The target melt flow rate of at most 80 dg/min or at most 70 dg/min is advantageous for lower FOG values.

In order to achieve good mechanical properties of the heterophasic propylene copolymer, the ratio of target to intermediate melt flow rate is at least 2, preferably from 2 to 20, for example from 2 to 15, more preferably from 2 to 10, even more preferably from 4 to 10.

Preferably, the heterophasic propylene copolymer having the target melt flow rate has a FOG value as measured in accordance with VDA 278 of at most 300 µg/g, preferably at most 250 µg/g, more preferably at most 200 µg/g and even more preferably at most 150 µg/g. The skilled person will understand that the term µg/g means micrograms of low molecular weight components per gram of polypropylene.

Optional Step III)

The heterophasic propylene copolymer has a relatively low FOG value of at most 350 µg/g after step II) without any further treatment for lowering the FOG value.

In some embodiments, it is possible to further reduce the FOG value of the heterophasic propylene copolymer by performing the step III) of maintaining the polypropylene obtained from step II) at an elevated temperature for a time sufficient to reduce the FOG value of the heterophasic propylene copolymer as determined in accordance with VDA 278. Such step is also known as a venting, purging or degassing step and as such is known to the person skilled in the art. However, it will be appreciated that the present invention is also directed to a process without such step III).

Depending on the conditions at which the heterophasic propylene copolymer is maintained in step III), practical lower limits of the FOG values of the heterophasic propylene copolymer obtained after step III) include at least 25 µg/g, at least 50 µg/g or at least 100 µg/g.

The heterophasic propylene copolymer obtained after step II) and/or III) may be combined with further additives.

For example, the heterophasic propylene copolymer obtained after step II) and/or optional step III) may be compounded with a reinforcing filler, such as talc, and thereafter maintained at an elevated temperature so as to reduce the FOG value (step III)).

In a preferred embodiment of the invention, the thermoplastic polymer composition further comprises B) an elastomer of ethylene and α-olefin comonomer having 4 to 8 carbon atoms.

The thermoplastic polymer composition may for example be prepared by dry-blending or melt-mixing the heterophasic propylene copolymer with the elastomer of ethylene and α-olefin comonomer having 4 to 8 carbon atoms.

The elastomer for example has a density in the range from 0.850 to 0.915 g/cm³. The elastomer may also sometimes be referred as a plastomer.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer. Most preferably, the elastomer is an ethylene-1-octene copolymer.

Preferably, the density of the elastomer is at least 0.865 g/cm³ and/or at most 0.910 g/cm³. For example, the density of the elastomer is at least 0.850, for example at least 0.865, for example at least 0.88, for example at least 0.90 and/or for example at most 0.915, for example at most 0.910, for example at most 0.907, for example at most 0.906 g/cm³. More preferable the density of the elastomer is in the range from 0.88 up to an including 0.907 g/cm³, most preferably, the density of the elastomer is in the range from 0.90 up to and including 0.906 g/cm³.

Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Mich. or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at most 35 dg/min. More preferably, the elastomer has a melt flow index of at least 1.5 dg/min, for example of at least 2 dg/min, for example of at least 2.5 dg/min, for example of at least 3 dg/min, more preferably at least 5 dg/min and/or preferably at most 30 dg/min, more preferably at most 20 dg/min, more preferably at most 10 dg/min measured in accordance with ISO 1133 using a 2.16 kg weight and at a temperature of 190° C.

Preferably, the amount of ethylene used to prepare the elastomer is at least 50 mol %. More preferably, the amount of ethylene used to prepare the elastomer is at least 57 mol %, for example at least 60 mol %, at least 65 mol % or at least 70 mol %. Even more preferably, the amount of ethylene used to prepare the elastomer is at least 75 mol %. The amount of ethylene used to prepare the elastomer may typically be at most 97.5 mol %, for example at most 95 mol % or at most 90 mol %.

Preferably the amount of elastomer (B) in the thermoplastic polymer composition is in the range of 1.0 to 40 wt % based on the total of the amount of heterophasic propylene copolymer (A) and the amount of elastomer (B), preferably, at least 1.0 wt %, more preferably at least 5 wt %, more preferably at least 10 wt % and/or at most 40 wt %, for example at most 30 wt %, for example at most 25 wt % based on the total of the amount of heterophasic propylene copolymer (A) and the amount of elastomer (B). Preferably, the amount of elastomer (B) in the thermoplastic polymer composition is in the range of 1.0 to 40 wt %, more preferably in the range of 5 to 30 wt %, most preferably in the range of 10 to 25 wt % based on the total of the amount of heterophasic propylene copolymer (A) and the amount of elastomer (B).

In another aspect, the invention relates to a process for the preparation of the pellet of the invention comprising the sequential steps of:

a) providing at least one continuous strand of glass filaments, preferably wherein the continuous strand of glass filaments contains at most 2 wt % of a sizing composition based on the total weight of the glass filaments, and b) applying an impregnating agent to said strand, preferably applying an amount of from 0.5 to 20 wt % of an impregnating agent based on the weight of the glass filaments (including the sizing composition) in the pellets, c) applying a sheath of the thermoplastic polymer composition around the strand of step b) to form a sheathed continuous strand of glass filaments covered at least in part with said impregnating agent;

d) cutting the sheathed continuous strand of glass filaments covered at least in part with said impregnating agent to pellets having a length in the range of 2-50 mm.

Any method known in the art to apply a sheath of thermoplastic polymer around the continuous strand of glass filaments may be used. The sheathing or wire-coating process typically involves the application of a thermoplastic polymer layer on the outer surface of the continuous glass strand as it passes through the thermoplastic polymer melt in a die. Document WO 2009/080281 for example describes a typical sheathing or wire-coating method. According to the present invention, the resulting sheathed continuous strand of glass filaments comprises a core containing the glass filaments that are at least partially covered with an impregnating agent and a sheath intimately surrounding the glass filaments.

Suitable examples of sizing compositions include solvent-based compositions, such as an organic material dissolved in aqueous solutions or dispersed in water and melt- or radiation cure-based compositions. More particularly, an aqueous sizing composition is traditionally applied on the individual glass filaments. As already described in the art, e.g. in documents EP1460166A1, EP0206189A1 or U.S. Pat. No. 4,338,233, the aqueous sizing composition typically includes film formers, coupling agents and other additional components. The film formers are generally present in an effective amount to protect glass filaments from inter-filament abrasion and to provide integrity and processability of glass filament strands after they are dried. Suitable film formers should be miscible with the polymer to be reinforced. For example, for reinforcing polypropylenes, suitable film formers generally comprise polyolefin waxes.

The coupling agents in the sizing composition are generally used to improve the adhesion between the thermoplastic polymer sheath, which in the moulded article will form the thermoplastic polymer matrix and the glass filament reinforcements. Suitable examples of coupling agents known in the art as being used for the glass fibres include organo-functional silanes.

Any other additional components known to the skilled person may be present in the sizing composition. Suitable examples include lubricants, antistatic agents, crosslinking agents, plasticizers, surfactants, nucleation agents, antioxidants, anti-foaming agents, pigments and any combinations thereof.

The continuous strand of glass filaments is usually provided from a bobbin on which it is wound. A continuous strand of glass filaments which for example contains at most 2 wt % of a sizing composition may be employed in the process of present invention. Preferably, a continuous strand of glass filaments containing from 0.1 to 1 wt % of sizing composition is used. The amount of sizing composition is determined from loss on ignition (LOI) measurement. The measurement of LOI is well-known for determining the amount of sizing on glass filaments. The glass filament density of the continuous strand of glass filaments may vary within wide limits. Preferably, the continuous strand of glass filaments may contain from 500 to 10000 glass filaments per strand, more preferably from 2000 to 5000 glass filaments per strand. The linear density of the strand is preferably from 1000 to 5000 tex, corresponding to 1000 to 5000 grams per 1000 meter. The thickness of the glass filaments is preferably in the range from 5 to 50 μm, more preferably from 10 to 30 μm, even more preferably from 15 to 25 μm. Usually the glass filaments are circular in cross section meaning the thickness as defined above would mean diameter.

The process of the present invention comprises a step of applying, preferably from 0.5 to 20 wt % based on the weight of the glass filaments (including the sizing composition) in the pellets, of an impregnating agent to said at least one continuous strand. Said impregnating agent is preferably non-volatile, has a melting point of at least about 20° C. below the melting point of the thermoplastic polymer sheath and/or has a viscosity of from 2.5 to 100 cS at application temperature. The impregnating agent is compatible with the thermoplastic polymer sheath meaning that the impregnating agent is miscible with the thermoplastic polymer used for the sheath. In other words, after molding of the pellets the impregnating agent will not form separate phases in the thermoplastic polymer matrix which is based on the thermoplastic polymer sheath. The step of applying the impregnating agent takes place after unwinding the packaged continuous strand of glass filaments containing the sizing composition, and in-line with the step of applying the thermoplastic polymer sheath around the strand of glass multifilaments. "In-line" means that no intermediate steps, such as for example storage or cooling, are performed between the step of applying the impregnating agent and the step of applying the thermoplastic polymer sheath. In practice both steps may be performed directly after each other, meaning for example that the impregnating agent still has relatively high temperature, hence a low viscosity.

The impregnating agent used in the present invention has at least two functions. Firstly, it mechanically couples the glass filaments, at least in part, to each other and to the thermoplastic polymer of the thermoplastic sheath. This function is important in view of reducing the amount of glass filaments separating from the pellets when such pellets are subjected to repetitive mechanical. Secondly, the impregnating agent is a compound that enhances the dispersion of the glass filaments in the thermoplastic polymer matrix during a moulding process wherein pellets are moulded into articles in which articles the glass filaments are distributed in the thermoplastic matrix of the article in a substantially uniform manner.

The viscosity of the impregnating agent is preferably lower than 100 cS, more preferably lower than 75 cS and more preferably lower than 25 cS at application temperature. The viscosity of the impregnating agent is preferably higher than 2.5 cS, more preferably higher than 5 cS, and more preferably higher than 7 cS at the application temperature. The melting point of the impregnating agent is preferably at least 20° C., preferably at least 25° C. or at least 30° C. below the melting point of the thermoplastic polymer composition. The application temperature of the impregnating agent is selected such that the desired viscosity range is obtained. The amount of impregnating agent that is applied depends on the thermoplastic polymer for the sheath, on the size (diameter) of the glass filaments of the continuous strand, and on the type of sizing that is on the surface of the glass filaments. The amount of impregnating agent applied to the continuous strand of glass filaments is preferably higher than 0.5 wt %, more preferably higher than 2 wt %, more preferably higher than 4 wt %, more preferably higher than 6 wt % based on the weight of the glass filaments (including the sizing composition) in the pellets. The amount of impregnating agent is preferably lower than 20 wt % more preferably lower than 18 wt %, more preferably lower than 15 wt % more preferably lower than 12 wt %. A certain minimum amount of impregnating agent is needed to assist homogeneous dispersion of glass filaments in the thermoplastic polymer matrix during moulding. An excess of impregnating agent may result in a decrease of mechanical properties of the moulded articles. Suitable examples of impregnating agents for use in combination with polypropylene as the material for the sheath may comprise highly branched poly(alpha-olefins), such as polyethylene waxes, modified low molecular weight polypropylenes, mineral oils, such as, paraffin or silicon oil and any mixtures of these compounds. Preferably, the impregnating agent comprises a highly branched poly(alpha-olefin) and, more preferably, the impregnating agent is a highly branched polyethylene wax. The wax may optionally be mixed with a hydrocarbon oil or wax like a paraffin oil to reach the desired viscosity. The impregnating agent is preferably non-volatile and/or substantially solvent-free. Non-volatile means that the impregnating agent does not evaporate under the application and processing conditions applied. "Substantially solvent-free" means that the impregnating agent contains less than 10% by mass of solvent, preferably less than 5% by mass solvent. Most preferably, the impregnating agent does not contain any organic solvent. The impregnating agent may further be mixed with other additives known in the art such as lubricants, antistatic agents, UV stabilizers, plasticizers, surfactants, nucleation agents, antioxidants, pigments, dyes, adhesion promoters, such as a modified (maleated) polypropylene, provided the viscosity remains within the desired range.

Any method known in the art may be used for applying the liquid impregnating agent to the continuous strand of glass filaments. Suitable methods for applying the impregnating agent include applicators having belts, rollers, and hot melt applicators. Suitable methods are for example described in documents EP0921919, EP0994978B1, EP0397505B1, WO2014/053590A1 and references cited therein.

Preferably, the thickness of the polymer sheath is between 500 and 1500 micrometer.

In another aspect, the invention relates to a process for producing an injection molded article comprising the step of:

a) injection molding the pellets of the invention into a mold and b) releasing the article thus produced from the mold.

In another aspect, the invention relates to use of the pellets of the invention for the production of an article, for example an injection molded article, for example an automotive article, for example automotive interior articles such as instrument panel carriers, door panels, dashboards, dashboard carriers, door claddings, door fixtures, armrests, pillar cladding, seat cladding, boot cladding, interior trims and applications in heating, ventilation or air conditioning (HVAC) applications.

In yet another aspect, the invention relates to an article obtained or obtainable from a pellet of the invention, preferably an injection molded article, for example automotive articles, for example automotive interior articles such as instrument panel carriers, door panels, dashboards, dashboard carriers, door claddings, door fixtures, armrests, pillar cladding, seat cladding, boot cladding, interior trims and applications in heating, ventilation or air conditioning (HVAC) applications.

The invention is now elucidated by way of the following examples relating to the thermoplastic polymer composition, in particular relating to the heterophasic propylene copolymer comprised in said thermoplastic polymer composition, without however being limited thereto.

EXAMPLES

Measurements

Melt flow rate was determined in accordance with ISO 1133 at 230° C. and 2.16 kg.

FOG values were determined in accordance with VDA 278. Immediately after peroxide shifting (step II), samples were taken and sealed in Lamigrip aluminium bags from Fisher Scientific. The FOG values were measured within a week from sealing the bags.

FOG was determined according to VDA 278:2011 from pellets. FOG according to VDA 278 is the sum of all organic compounds of low volatility, which have an elution time greater than or equal to n-tetradecane. FOG is calculated as tetradecane equivalent (TE). FOG according to VDA 278 represents organic compounds in the boiling point range of n-alkanes $C_{14}$ to $C_{32}$. VDA standards are issued by "Verband der Automobilindustrie". The VDA standards used herein are available from Dokumentation Kraftfahrwesen (DKF); Ulrichstrasse 14, D-74321 Bietigheim-issingen, Germany or can be downloaded from their website (www.dkf-ev.de).

Experimental

Procatalyst I

Catalyst I is prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

Procatalyst II

A. Grignard Formation Step

A stirred flask, fitted with a reflux condenser and a funnel, was filled with magnesium powder (24.3 g). The flask was brought under nitrogen. The magnesium was heated at 80° C. for 1 hour, after which dibutyl ether (DBE, 150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butylmagnesiumchloride (reaction product of step A) with a concentration of 1.0 mol Mg/l was obtained.

B. Preparation of the Intermediate Reaction Product 250 mL of dibutyl ether was introduced to a 1 L reactor fitted with a propeller stirrer and two baffles. The reactor was thermostated at 35° C. and the stirrer speed was kept at 200 rpm. Then a cooled (to 15° C.) 360 mL solution of the Grignard reaction product as prepared in A and 180 ml of a cooled (to 15° C.) solution of 38 ml of tetraethoxysilane (TES) in 142 ml of DBE were dosed into the reactor for 400 min. with preliminary mixing in a minimixer of 0.15 ml volume, which was cooled to 15° C. by means of cold water circulating in the minimixer jacket. The premixing time was 18 seconds in the minimixer and the connecting tube between the minimixer and the reactor. The stirring speed in the minimixer was 1000 rpm. On the dosing completion, the reaction mixture was kept at 35° C. for 0.5 hours. Then the reactor was heated to 60° C. and kept at this temperature for 1 hour. Then the stirring was stopped and the solid substance was allowed to settle. The supernatant was removed by decanting. The solid substance was washed three times using 300 ml of heptane. As a result, a white solid reaction product was obtained and suspended in 200 ml of heptane.

Under an inert nitrogen atmosphere at 20° C. a 250 ml glass flask equipped with a mechanical agitator is filled with a slurry of 5 g of the reaction product of step B dispersed in 60 ml of heptane. Subsequently, a solution of 0.86 ml methanol (MeOH/Mg=0.5 mol) in 20 ml heptane is dosed under stirring during 1 hour. After keeping the reaction mixture at 200° C. for 30 minutes the slurry was slowly allowed to warm up to 300° C. for 30 min and kept at that temperature for another 2 hours. Finally the supernatant liquid is decanted from the solid reaction product which was washed once with 90 ml of heptane at 300° C.

C. Preparation of the Catalyst

A reactor was brought under nitrogen and 125 ml of titanium tetrachloride was added to it. The reactor was heated to 90° C. and a suspension, containing about 5.5 g of the support obtained in step C in 15 ml of heptane, was added to it under stirring. The reaction mixture was kept at 90° C. for 10 min. Then ethyl benzoate was added (EB/Mg=0.15 molar ratio). The reaction mixture was kept for 60 min. Then the stirring was stopped and the solid substance was allowed to settle. The supernatant was removed by decanting, after which the solid product was washed with chlorobenzene (125 ml) at 90° C. for 20 min. The washing solution was removed by decanting, after which a mixture of titanium tetrachloride (62.5 ml) and chlorobenzene (62.5 ml) was added. The reaction mixture was kept at 90° C. for 30 min. After which the stirring was stopped and the solid substance was allowed to settle. The supernatant was removed by decanting, after which a mixture of titanium tetrachloride (62.5 ml) and chlorobenzene (62.5 ml) was added. Then di-n-butyl phthalate (DBP) (DBP/Mg=0.15 molar ratio) in 3 ml of chlorobenzene was added to reactor and the temperature of reaction mixture was increased to 115° C. The reaction mixture was kept at 115° C. for 30 min. After which the stirring was stopped and the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting and the solid was washed five times using 150 ml of heptane at 600° C., after which the catalyst III, suspended in heptane, was obtained.

Procatalyst III

Catalyst III is prepared according to the method described in U.S. Pat. No. 5,093,415 of Dow, hereby incorporated by reference. This patent discloses an improved process to prepare a catalyst including a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst.

Propylene Homopolymer Polymerization Experiments (Reference)

Polymerization experiments of propylene homopolymers (Table 1) were performed on a bench-scale gas-phase reactor using procatalysts I, II and III described above with different external electron donors in order to determine the effect of the external electron donors on the FOG values of polypropylene. Triethylaluminium was used as co-catalyst, and two external electron donors were employed; di(iso-propyl) dimethoxysilane (DiPDMS) and n-propyltriethoxysilane (nPTES). Homopolymers produced using nPTES are denoted with RE as reference experiments. Homopolymers produced using DiPDMS are denoted with CE as comparative experiments. RE and CE together show the effects of the type of the external electron donors on the FOG values of polypropylene. Propylene homopolymers of melt flows 20 and 50 dg/min were produced at different H2/C3 molar ratios, due to the different hydrogen sensitivity of the external donors. H2/C3 is the molar ratio of hydrogen to propylene in the gas cap of the reactor, measured by on-line gas chromatography.

From Table 1, it is clear that, whatever the procatalyst used, the use of nPTES as external electron donor always results in propylene homopolymers with lower FOG emissions compared to materials with similar MFR values and made using other external electron donors. This can be for example illustrated by comparing RE2 with CE2 and when comparing RE5 with CE5. This table also shows that FOG value of a propylene homopolymer with a certain procatalyst system increases with increasing melt flow rate.

Moreover, the combination of nPTES with procatalyst Ill leads to the lowest FOG values at given MFR. For instance, this can be observed when comparing RE6 with RE2 and RE4.

The findings from these results on propylene homopolymers can be applied for heterophasic propylene copolymers.

TABLE 1 polymerization and FOG data of PP homopolymers

| Exp # | Procatalyst | External Donor | $H_2/C_3$ mol/mol | MFR R1 dg/min | FOG µg/g |
|---|---|---|---|---|---|
| CE1 | I | DiPDMS | 0.061 | 20 | 378 |
| RE1 | I | nPTES | 0.0175 | 20 | 287 |
| CE2 | I | DiPDMS | 0.087 | 50 | 790 |
| RE2 | I | nPTES | 0.039 | 50 | 335 |
| CE3 | II | DiPDMS | 0.062 | 20 | 440 |
| RE3 | II | nPTES | 0.013 | 20 | 215 |
| CE4 | II | DiPDMS | 0.085 | 50 | 543 |
| RE4 | II | nPTES | 0.031 | 50 | 246 |
| CE5 | III | DiPDMS | 0.0376 | 20 | 301 |
| RE5 | III | nPTES | 0.0085 | 20 | 166 |
| CE6 | III | DiPDMS | 0.07 | 50 | 473 |
| RE6 | III | nPTES | 0.0244 | 50 | 218 |

* Materials polymerized at bench scale and then extruded on mini-extruder

Heterophasic Propylene Copolymer Polymerization Experiments step I)

Four heterophasic propylene copolymers (B, C, E, F) were produced by co-polymerization of propylene and ethylene using two reactors in series. In the first reactor (temperature 60-85° C., pressure $2.2 \cdot 10^6$-$3.0 \cdot 10^6$ bar), the propylene homopolymer matrix phase was prepared. After polymerization, the powder was transported from the first to the second reactor (temperature 60-85° C., pressure $2.2.10^6$-$3.0 \cdot 10^6$ bar) where the polymerization of the rubber phase consisting of an ethylene-propylene copolymer was done. Materials were prepared using the catalyst system composed of procatalyst III and nPTES that shows the most promising results in terms of FOG emissions for propylene homopolymers (Table 1). For two heterophasic copolymers (B and E), respective homopolymers (A and D) were also produced to compare emission levels. Table 2 provides an overview of reactor powders A-F that were prepared in this manner. MFR R1 represents the melt flow rate of the propylene homopolymer manufactured in the first reactor, whereas total MFR represents the melt flow rate of the intermediate heterophasic propylene copolymer powder, i.e. the propylene heterophasic copolymers. RC represents the amount of rubber phase based on the total weight of the heterophasic propylene copolymer. The ethylene weight percentage of the ethylene-propylene rubber phase (i.e. RCC2) was set at 53 wt % for all the heterophasic propylene copolymers.

TABLE 2

FOG data of PP homopolymers and respective heterophasic copolymers (RCC2 53 wt %)

| Exp # | Catalyst | Ext. Donor | $H_2/C_3$ R1 mol/mol | MFR R1 dg/min | Total MFR dg/min | RC wt. % | FOG µg/g |
|---|---|---|---|---|---|---|---|
| A | III | nPTES | 0.006 | 15 | — | — | 124 |
| B | III | nPTES | 0.006 | 15 | 5.5 | 28.2 | 130 |
| C | III | nPTES | 0.0104 | 24 | 9 | 27.8 | 127 |
| D | III | nPTES | 0.019 | 40 | — | — | 164 |
| E | III | nPTES | 0.019 | 40 | 17 | 26.6 | 172 |
| F | III | nPTES | 0.028 | 60 | 27.5 | 22.4 | 343 |
| G | III | nPTES | 0.0083 | 20 | 9.5 | 22.1 | 120 |
| H | III | nPTES | 0.0083 | 20 | 12 | 18.3 | 115 |
| I | III | nPTES | 0.108 | 25 | 10 | 22.2 | 161 |

From Table 2, it is clear that FOG emissions of propylene heterophasic copolymers are directly related to the molecular characteristics of the propylene homopolymer produced in the first reactor (i.e. MFR R1), whereas the contribution of the high molecular weight rubber phase to the sum of all organic compounds of low volatility is negligible. This can be observed when comparing Examples A and B together, or also Examples D and E. Similar FOG values are measured for the propylene homopolymer as its respective heterophasic copolymer.

Step II)

For achieving high flow propylene heterophasic copolymers, these reactor powders (the intermediate heterophasic propylene copolymer powders) were melt-processed by peroxide shifting (i.e. visbreaking) to higher melt flow rates to obtain the final heterophasic propylene copolymer. This was done by feeding the powder to an extruder and adding Luperco 802PP40 as a peroxide (1,4-bis(2-tert-butylperoxy-propan-2-yl)benzene, CAS Registry Number: 2781-00-2) in different concentrations. Table 3 lists details of the visbreaking experiments for reactor powders C and F including starting MFR (intermediate MFR) and final MFR (target MFR), the amount of peroxide in weight percentage and FOG values. Besides the peroxide, some additives common in the art were also added (0.25 weight percentage). The additive package was the same for all experiments.

Table 3 shows that the visbreaking of a heterophasic propylene copolymer to higher melt flow rates commonly results in increased FOG values. The same table however also demonstrates that lower FOG values can be obtained when using the visbreaking process to reach a certain melt flow rate compared to virgin reactor powder with the same final MFR. For instance, Example CS1, which is peroxide shifted from MFR 9 to 27 dg/min, has a lower FOG value than Example F, a polymerized reactor powder with same MFR. Example CS3 shows the preparation of a heterophasic propylene copolymer of a relatively low MFR (9 dg/min) and subsequent visbreaking has a high final MFR (59 dg/min) and a low FOG value (325 µg/g). However, peroxide shifting an heterophasic propylene copolymer with a lower intermediate MFR to a high final MFR leads to higher FOG values due to the large concentration of peroxide required to reach the target MFR value as compared to peroxide shifting of an heterophasic propylene copolymer with a somewhat higher intermediate MFR to the same final MFR. For instance, Example BS3, which is peroxide shifted from MFR 5.5 to 65 dg/min, has a significantly higher FOG value than Example CS3, which is peroxide shifted from MFR 9 to 59 dg/min. The person skilled in the art knows how to vary the MFR value of the intermediate heterophasic propylene copolymer (for example by varying the MFR of the propylene homopolymer, by varying the MFR of the rubber phase or by varing the RC). As is shown above, the MFR value of the intermediate heterophasic propylene copolymer influences the FOG values for the desired MFR of the final heterophasic propylene copolymer.

TABLE 3

FOG data of PP impact base powders (the intermediate heterophasic propylene copolymer) and the peroxide shifted products (the final heterophasic propylene copolymer)

| Exp # | Intermediate MFR dg/min | Target MFR dg/min | Target MFR Intermediate MFR | Peroxide wt. % | RC wt. % | FOG µg/g |
|---|---|---|---|---|---|---|
| B | 5.5 | 5.5 | 1 | 0 | 28.2 | 130 |
| BS1 | 5.5 | 29 | 5.2 | 0.19 | 28.2 | 300 |
| BS2 | 5.5 | 41 | 7.4 | 0.23 | 28.2 | 375 |
| BS3 | 5.5 | 65 | 11.8 | 0.37 | 28.2 | 511 |
| C | 9 | 9 | 1 | 0 | 27.8 | 127 |
| CS1 | 9 | 27 | 3 | 0.08 | 27.8 | 228 |
| CS2 | 9 | 40 | 4.4 | 0.14 | 27.8 | 284 |
| CS3 | 9 | 59 | 6.6 | 0.2 | 27.8 | 325 |
| E | 17 | 17 | 1 | 0 | 26.5 | 172 |
| ES1 | 17 | 28 | 1.6 | 0.035 | 26.5 | 298 |
| ES2 | 17 | 61 | 3.6 | 0.085 | 26.5 | 458 |
| F | 27.5 | 27.5 | 1 | 0 | 22.4 | 343 |
| FS1 | 27.5 | 55 | 2 | 0.08 | 22.4 | 448 |
| G | 9.5 | 9.5 | 1 | 0 | 22.1 | 120 |

TABLE 3-continued

FOG data of PP impact base powders (the intermediate heterophasic propylene copolymer) and the peroxide shifted products (the final heterophasic propylene copolymer)

| Exp # | Intermediate MFR dg/min | Target MFR dg/min | Target MFR Intermediate MFR | Peroxide wt. % | RC wt. % | FOG µg/g |
|---|---|---|---|---|---|---|
| GS1 | 9.5 | 62 | 6.5 | 0.24 | 22.1 | 322 |
| H | 12 | 12 | 1 | 0 | 18.3 | 115 |
| HS1 | 12 | 60 | 5 | 0.216 | 18.3 | 316 |
| I | 10 | 9.5 | 1 | 0 | 22.2 | 161 |
| IS1 | 10 | 41 | 4.1 | 0.13 | 22.2 | 333 |

* BS1, BS2 and BS3 are peroxide shifted heterophasic copolymers from experiment B, CS1 and CS2 are peroxide shifted heterophasic copolymers from experiment C, ES1 and ES2 are peroxide shifted heterophasic copolymers from experiment E, FS1 is heterophasic copolymer peroxide shifted from experiment F, GS1 is peroxide shifted heterophasic copolymer from experiment G, HS1 is peroxide shifted heterophasic copolymer from experiment H and IS1 is peroxide shifted heterophasic copolymer from experiment I.

intermediate MFR is the MFR of the intermediate heterophasic propylene copolymer target MFR is the MFR of the final heterophasic propylene copolymer To allow a direct comparison, all VDA278 measurements were carried out on the same GC equipment.

As also shown by the examples above, the shifting ratio is preferably chosen such that it complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer.

Preferably, in such process, the intermediate heterophasic propylene copolymer has a propylene-based matrix with a melt flow rate of at most 70 dg/min as determined in accordance with ISO1133 (230° C., 2.16 kg).

Reference Experiments WO2014/044680A1

The experiments of WO2014/044680 A1 were repeated using the same coated talc as sample number 2 in this patent application, the FOG was also measured.

TABLE 4

FOG data of PP impact base powders (the intermediate heterophasic propylene copolymer) and the peroxide shifted products (the final heterophasic propylene copolymer) unfilled and filled with 2.5 wt % of talc (Ref to WO2014/044680 A1).

| Exp # | Intermediate MFR dg/min | Target MFR dg/min | Target MFR Intermediate MFR | Talc wt. % | Peroxide wt. % | FOG µg/g |
|---|---|---|---|---|---|---|
| CET1 | 1.5 | 1.5 | 1 | 0 | 0 | 256 |
| CET2 | 1.5 | 1.5 | 1 | 2.5 | 0 | 232 |
| CET3 | 1.5 | 15 | 10 | 0 | 0.16 | 509 |
| CET4 | 1.5 | 15 | 10 | 2.5 | 0.16 | 537 |
| CET5 | 1.5 | 40 | 26.7 | 0 | 0.3 | 655 |
| CET6 | 1.5 | 40 | 26.7 | 2.5 | 0.3 | 766 |
| CET7 | 1.5 | 60 | 40 | 0 | 0.5 | 804 |

As can be seen from Table 4 above, the FOG of the heterophasic propylene copolymer prepared in accordance with WO2014/044680A1 and shifted to a melt flow rate of at least 40 g/10 min have an FOG of well above 350 µg/g as determined by VDA 278, whereas the FOG values of CET 1 and 2 are below 350 µg/g as determined by VDA 278;

Compare for instance, CET5 in Table 4, which is a heterophasic propylene copolymer that is peroxide shifted to a final MFR 40 and whih displays a FOG value of 655 µg/g to the sample IS1 (final heterophasic propylene copolymer), which has a FOG value of 333 µg/g and a MFR value of 41 dg/min (see Table 3).

In addition, as is shown in Table 4, the addition of talc does not have any influence on the FOG value.

Therefore, the examples demonstrate that heterophasic propylene copolymers combining high melt flow and low FOG emissions can for example be produced in the two-step process described herein, wherein step I is performed in the presence of a catalyst system comprising a Ziegler-Natta catalyst and at least one external electron donor chosen from the group of a compound having a structure according to Formula III $(R^{90})_2N\text{—}Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, preferably ethyl, methyl or n-propyl, more preferably wherein the at least one external electron donor is chosen from the group of diethylaminotriethoxysilane (DEATES), n-propyl triethoxysilane, (nPTES), n-propyl trimethoxysilane (nPTMS) and mixtures thereof.

CONCLUSION

It is clear to the person skilled in the art, that the heterophasic propylene copolymer of the inventive examples can be used for the preparation of the thermoplastic polymer sheath. The pellets of the invention can for example be prepared using wire-coating and pultrusion methods known to the person skilled in the art. The use of the heterophasic propylene copolymer of the inventive examples will results in pellets (and articles prepared therefrom) having high stiffness, in combination with reduced emissions. When the heterophasic propylene copolymer consists of a dispersed ethylene-α-olefin copolymer present in an amount of at least 20 wt % based on the total heterophasic propylene copolymer, the impact resistance will also be sufficient. At the same time, a high melt flow rate of the thermoplastic polymer sheath will facilitate the production of injection molded articles prepared from such pellets.

For purpose of the invention, stiffness can be determined by measuring the flexural modulus and the flexural strength as determined at 23° C. according to the ASTM D790 Procedure B. ASTM D790 parallel and perpendicular measurements are then done on 65×12.7×3.2 mm cut samples. Alternatively, stiffness can be measured by determining the tensile properties according to ISO 527/1A at 23° C.

In addition, if the thermoplastic polymer sheath comprises both the heterophasic propylene copolymer of the inventive examples and an elastomer of ethylene and α-olefin comonomer having 4 to 8 carbon atoms, impact resistance may be further improved.

For purpose of the invention, impact resistance is measured by notched Izod impact parallel and perpendicular measurements at 23° C. according to ISO180/1A and at −20° C. according to ISO180/1A.

The invention claimed is:

1. A pellet comprising a thermoplastic polymer sheath intimately surrounding glass filaments, which glass filaments are covered at least in part with an impregnating agent and extend in a longitudinal direction of said pellets, wherein the thermoplastic polymer sheath is prepared from a thermoplastic polymer composition comprising A) a heterophasic propylene copolymer consisting of a propylene-based matrix and a dispersed ethylene-α-olefin copolymer, wherein the heterophasic propylene copolymer has a melt flow rate of at least 40 g/10 min as determined in accordance with ISO 1133 (230° C., 2.16 kg) and a FOG value of at most 350 µg/g as determined by VDA 278, wherein the glass filaments are present in an amount of 10-70 wt % based on the pellet, wherein the dispersed ethylene-α-olefin copolymer is present in an amount of at least 20 wt % based on a total weight of the heterophasic propylene copolymer;
wherein the thermoplastic polymer composition further comprises B) an elastomer of ethylene and α-olefin comonomer having 4 to 8 carbon atoms.

2. The pellet according to claim 1, wherein the heterophasic propylene copolymer is obtained by visbreaking of an intermediate heterophasic propylene copolymer.

3. The pellet according to claim 1, wherein the heterophasic propylene copolymer consists of
(a) a propylene-based matrix,
wherein the propylene-based matrix consists of a propylene homopolymer and/or a propylene-α-olefin copolymer prepared from at least 90 wt % of propylene and at most 10 wt % of α-olefin, based on the total weight of the propylene-based matrix and
wherein the propylene-based matrix is present in an amount of 60 to 95 wt % based on the total heterophasic propylene copolymer and
(b) a dispersed ethylene-α-olefin copolymer,
wherein the dispersed ethylene-α-olefin copolymer is present in an amount of 40 to 20 wt % based on the total heterophasic propylene copolymer, and
wherein a sum of a total amount of propylene-based matrix and total amount of the dispersed ethylene-α-olefin copolymer in the heterophasic propylene copolymer is 100 wt %.

4. The pellet according to claim 1, wherein an amount of ethylene used to prepare the ethylene-α-olefin copolymer is in a range of 20-65 wt % based on the ethylene-α-olefin copolymer.

5. The pellet according to claim 1, wherein the propylene-based matrix consists of a propylene homopolymer.

6. The pellet according to claim 1, wherein the α-olefin used to prepare the ethylene-α-olefin copolymer is selected from the group consisting of α-olefins having 3 to 8 carbon atoms and any mixtures thereof.

7. The pellet according to claim 1, wherein the melt flow rate of the heterophasic propylene copolymer is at most 90 g/10 min, measured according to ISO 1133, 230° C. 2.16 kg.

8. The pellet according to claim 1, wherein the heterophasic propylene copolymer is prepared by contacting propylene and optional α-olefin and/or ethylene and α-olefin with a catalyst system comprising a Ziegler-Natta catalyst and at least one external electron donor selected from the group consisting of a compound having a structure according to Formula III $(R^{90})_2N-Si(OR^{91})_3$, a compound having a structure according to Formula IV: $(R^{92})Si(OR^{93})_3$ and mixtures thereof, wherein each of $R^{90}$, $R^{91}$, $R^{92}$, and $R^{93}$, groups are each independently a linear, branched or cyclic, substituted or unsubstituted alkyl having between 1 and 10 carbon atoms.

9. The pellet according to claim 1, wherein a thickness of the glass filaments preferably is in a range from 5 to 50 µm.

10. The pellet according to claim 1, wherein the impregnating agent has a melting point of at least 20° C. below a melting point of the thermoplastic polymer sheath.

11. A process for the preparation of the pellet of claim 1, comprising the sequential steps of:
a) providing at least one continuous strand of glass filaments,
b) applying an impregnating agent to said strand,
c) applying a sheath of the thermoplastic polymer composition around the strand of step b) to form a sheathed continuous strand of glass filaments covered at least in part with said impregnating agent, and
d) cutting the sheathed continuous strand of glass filaments covered at least in part with said impregnating agent to pellets having a length in the range of 2-50 mm.

12. A process for producing an injection molded article comprising the step of:
a) injection molding the pellets of claim 1 into a mold; and
b) releasing the article thus produced from the mold.

13. An article obtained from a pellet according to claim 1.

14. The pellet according to claim 1,
wherein the heterophasic propylene copolymer is obtained by visbreaking of an intermediate heterophasic propylene copolymer in a shifting ratio, which complies with the following formula:

$$0.0011x^2-0.011x+1 \leq \text{shifting ratio} \leq -0.0009x^2+0.1963x+1$$

wherein x stands for the melt flow rate of the heterophasic propylene copolymer obtained after visbreaking of the intermediate heterophasic propylene copolymer, wherein the shifting ratio is the melt flow rate of the heterophasic propylene copolymer divided by a melt flow rate of the intermediate heterophasic propylene copolymer, and wherein the melt flow rates are determined in accordance with ISO1133 (230° C., 2.16 kg),
wherein the heterophasic propylene copolymer consists of
(a) a propylene-based matrix, wherein the propylene-based matrix consists of a propylene homopolymer and/or a propylene-α-olefin copolymer prepared from at least 90 wt % of propylene and at most 10 wt % of α-olefin, based on a total weight of the propylene-based matrix, and wherein the propylene-based matrix is present in an amount of 60 to 95 wt % based on the total heterophasic propylene copolymer, and (b) a dispersed ethylene-α-olefin copolymer, wherein the dispersed ethylene-α-olefin copolymer is present in an amount of 40 to 20 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein an amount of ethylene used to prepare the ethylene-α-olefin copolymer is in a range of 20-65 wt % based on the ethylene-α-olefin copolymer, wherein the melt flow rate of the heterophasic propylene copolymer is at most 70 g/ 10 min as measured according to ISO 1133 (230° C., 2.16 kg), wherein the thermoplastic polymer composition further comprises B) an elastomer of ethylene and α-olefin comonomer having 4 to 8 carbon atoms, and wherein the impregnating agent has a melting point of at least 20° C. below a melting point of the thermoplastic polymer sheath.

15. The pellet according to claim 14, wherein the propylene-based matrix consists of a propylene homopolymer, and wherein the α-olefin used to prepare the ethylene-α-olefin copolymer is propylene.

16. The pellet according to claim 8, wherein the at least one external electron donor is selected from the group consisting of diethylaminotriethoxysilane (DEATES), n-propyl triethoxysilane, (nPTES), n-propyl trimethoxysilane (nPTMS), and mixtures thereof.

* * * * *